United States Patent
Löwer et al.

[11] Patent Number: 5,846,659
[45] Date of Patent: Dec. 8, 1998

[54] UV-PROTECTED, MULTILAYER POLYCARBONATE SHEETS

[75] Inventors: Hartmut Löwer, Krefeld; Siegfried Anders, Köln; Helmut Schmid, Krefeld; Wolfgang Nising, Augustin, all of Germany

[73] Assignee: Bayer Aktiengesellschaft, Leverkusen, Germany

[21] Appl. No.: 568,989

[22] Filed: Dec. 7, 1995

[30] Foreign Application Priority Data

Dec. 16, 1994 [DE] Germany .......................... 44 44 868.6

[51] Int. Cl.⁶ ...................................................... B32B 27/36
[52] U.S. Cl. ............................................. 428/412; 428/913
[58] Field of Search ...................... 428/412, 913

[56] References Cited

FOREIGN PATENT DOCUMENTS

| | | |
|---|---|---|
| 110 221 | 6/1984 | European Pat. Off. . |
| 110 238 | 6/1984 | European Pat. Off. . |
| A-0 110 221 | 6/1984 | European Pat. Off. . |
| A-0 338 355 | 4/1989 | European Pat. Off. . |
| A-0 320 632 | 6/1989 | European Pat. Off. . |
| A-0 359 622 | 3/1990 | European Pat. Off. . |
| A-0 569 878 | 11/1993 | European Pat. Off. . |
| A-0 599 208 | 11/1993 | European Pat. Off. . |
| A-0 683 192 | 3/1996 | European Pat. Off. . |

OTHER PUBLICATIONS

Derwent Publication, JP-A-06 064 123 (Dumitomo Dow Ltd.), 6(1994).

Derwent Publication, JP-A-06 064 114, (Asahi Chem. Ind. Co. Ltd), 3(1994).

Derwent Publications, JP-A-06 071 832, Asahi Chem. Ind., Co. Ltd), 3(1994).

"Flow Problems in Multilayer Fluxes", (Dr. M. Meier, 1990).

"New Aspects in Multilayer Composites", Neue Verpackung 7, pp. 1041–1046(1978).

*Primary Examiner*—Leszek Kiliman
*Attorney, Agent, or Firm*—Connolly and Hutz

[57] ABSTRACT

The present invention relates to UV-protected, multilayer polycarbonate sheets containing a base sheet, at least one outer layer and optionally at least one additional protective layer, and to the production of the polycarbonate sheets according to the invention by coextrusion.

4 Claims, No Drawings

UV-PROTECTED, MULTILAYER POLYCARBONATE SHEETS

The present invention relates to UV-protected, multilayer polycarbonate sheets, containing 1. a base sheet of thermoplastic polycarbonate which contains no UV absorber or >0 to 1% by weight of UV absorber and which has a viscosity at 280° C. and at a shear rate of 100 s$^{-1}$ of 500 Pa·s to 2500 Pa·s, preferably of 750 Pa·s to 2000 Pa·s, and which has, on at least one side of the base sheet,
2. an outer layer of thermoplastic polycarbonate, which has a content of UV absorber of 2% by weight to 20% by weight, preferably of 2% by weight to 15% by weight, and particularly of 3% by weight to 13% by weight, and which has a viscosity at 280° C. and at a shear rate of 100 s$^{-1}$ of 200 Pa·s to 2300 Pa·s, preferably of 300 Pa·s to 2000 Pa·s, which is characterised in that the viscosity of the outer layer 2 is at least 50 Pa·s, preferably 100 Pa·s to 2000 Pa·s, lower in each case than the viscosity of the respective base sheet 1.

The base sheet 1 may be coated either on one side or on both sides with the outer layer 2. The thickness of the polycarbonate sheets according to the invention results from the base sheet of 0.4 mm to 50 mm and at least one outer layer, containing UV absorber, of 10 μm to 100 μm.

An additional protective layer 3, comprising polycarbonate with UV absorber contents of 0.1% by weight to 20% by weight, with viscosities at 280° C. and at a shear rate of 100 s$^{-1}$ of 200 Pa·s to 2300 Pa·s, preferably of 300 Pa·s to 2000 Pa·s, and with thicknesses of 2 μm to 100 μm, may optionally be applied in the known manner to one or both outer layers.

In this respect the difference in viscosity between the protective layer 3 and the outer layer 2 is of secondary importance in each case, and is therefore of an arbitrary magnitude. It may also be zero Pa·s.

Thus the present invention also relates to multilayer polycarbonate sheets, containing 1. a base sheet 1 according to the invention,
2. the outer layer 2 according to the invention on at least one side of the base sheet 1 and, at least
3. on one side of the outer layer 2 facing away from the base sheet 1, a protective layer 3 of polycarbonate which is characterised in that it has a UV absorber content of 0.1% by weight to 20% by weight, viscosities at 280° C. and at a shear rate of 100 s$^{-1}$ of 200 Pa·s to 2300 Pa·s, preferably of 300 Pa·s to 2000 Pa·s, and a thickness of 2 μm to 100 μm, wherein the difference in viscosity between the protective layer 3 and the outer layer 2 is of arbitrary magnitude in each case or is zero Pa·s.

Multilayer plastic sheets made of polycarbonate are known which are provided with coextruded layers made of plastics having a high content of UV absorbers for additional protection from weathering effects.

Thus EP 110 221 describes coextruded, multilayer plastic sheets made of polycarbonate having at least one outer layer made of polycarbonate containing UV absorbers.

EP 110 238 describes coextruded, multilayer plastic sheets made of polycarbonate, which in addition to a layer of polycarbonate containing UV absorbers have a further outer layer made of polycarbonate for preventing the volatilisation of UV absorbers.

Nothing is stated in these patents regarding the viscosity relationships between these layers and their connection with surface quality.

The technological and scientific report of the IKV in Aachen, "Flow Problems in Multilayer Fluxes" (Dr. M. Meier, 1990) describes flow defects which also occur during the coextrusion of polycarbonate sheets and multi-wall panels which are stabilised against weathering. These so-called layer boundary instabilities are parabolic defects which are closed on one side in the direction of extrusion and which occur at the interface between the base material and the UV protective layer material (page 73 et seq.). They result in streaks in the sheet which can affect the quality of the surface. According to this report they can generally best be controlled when the viscosity ratio between the outer layer and the base sheet is 1, i.e. when both materials have the same viscosity. Exceptions to this rule are reported, for which even identical viscosities do not result in a faultless surface. No explanations for these exceptions or instructions for avoiding these special cases are given, however.

The article by D. Djordjevic, "New Aspects in Multilayer Composites", Neue Verpackuing [New Packaging] 7 (1978), page 104 et seq., describes the Theological prerequisites for producing multilayer composites by means of coextrusion. According to this article, an important criterion for the selection of polymers for this purpose is their similar rheological nature.

In summary, it can be inferred from this prior art literature that good optical qualities are always obtained in the production of multilayer composites by means of coextrusion when the viscosities of the materials used are equal.

However, it has been found that this finding does not apply to the production of weather-proof sheets and multi-wall panels from polycarbonate by coextrusion with polycarbonates having high contents of UV absorbers as the outer layer. If materials with the same viscosity are selected for the production of sheets such as these, layer boundary instabilities always occur, which are not only—as stated in the literature—of parabolic appearance.

The object was therefore to develop weather-proof polycarbonate sheets and multi-wall panels which can be produced by coextrusion without layer boundary instabilities occurring.

Surprisingly, it has now been found that, contrary to current teaching, layer boundary instabilities can always be prevented during the coextrusion of polycarbonate sheets and multi-wall panels having polycarbonate outer layers with a high content of UV absorbers if the viscosity of the outer layer containing UV absorbers which is used is lower than the viscosity of the polycarbonate base layer.

Thus the present invention also relates to the production of the polycarbonate sheets according to the invention by coextrusion, which is characterised in that the molten length of core material and the outer layer or outer layers are brought together in the known manner with the aid of a coextrusion adapter and subsequently formed into the desired shape in a closed extrusion die.

The thermoplastic aromatic polycarbonates to be used for the polycarbonate sheets in the sense of the present invention comprise both polycarbonate homopolymers and polycarbonate copolymers; the polycarbonates may be straight chain or branched in the known manner.

These polycarbonate starting materials are prepared in the known manner from diphenols, carboxylic acid derivatives, optionally chain terminators and optionally branching agents.

Details of the preparation of polycarbonates have been disclosed in many patent specifications over approximately the past 40 years. By way of example, reference is merely made here to the article by Schnell, "Chemistry and Physics of Polycarbonates", Polymer Reviews, Volume 9, Interscience Publishers, New York, London, Sydney 1964; to D. Freitag, U. Grigo, P. R. Müller, W. Nouvertné, BAYER AG, "Polycarbonates" in the Encyclopedia of Polymer Science and Engineering, Volume 11, Second Edition, 1988, pages 648–718; and finally to Drs. U. Grigo, K. Kricher and P. R. Müller, "Polycarbonates" in Becker/Braun, Kunststoff-Handbuch [Plastics Handbook], Volume 3/1, Polycarbonates, Polyacetals, Polyesters, Cellulose Esters, Carl Hanser Verlag, Munich, Vienna 1992, pages 117–299.

Examples of diphenols which are suitable for the preparation of polycarbonates include hydroquinone, resorcinol, dihydroxydiphenyls, bis-(hydroxyphenyl), alkanes, bis (hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, α,α'-bis-(hydroxyphenyl)-diiso-propylbenzenes, and compounds thereof containing alkylated and halogenated nuclei.

Preferred diphenols comprise 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-pdiisopropylbenzene, 2,2-bis-(3-methyl-4-hydroxyphenyl)-propane, 2,2-bis-(3-chloro-4hydroxyphenyl)-propane, bis-(3,5-dimethyl-4-hydroxyphenyl)-methane, 2,2-bis-(3,5dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols comprise 2,2-bis-(4-hydroxyphenyl)-propane, 2,2-bis(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)cyclohexane and 1,1-bis-(4-hydroxyphenyl)-3,3,5-trimethyl-cyclohexane.

These and other suitable diphenols are described, for example, in U.S. Pat. No. 3,028,635, 2,999,835, 3,148,172, 2,991,273, 3,271,367, 4,982,014 and 2,999,846, in German Offenlegungsschriften 1,570,703, 2,063,050, 2,036,052, 2,211,956 and 3,832,396, in French Patent Specification 1,561,518, in the monograph by H. Schnell, "Chemistry and Physics of Polycarbonates", Interscience Publishers, New York 1964" and in Japanese patents laid open to public inspection 62039/1986, 62040/1986 and 105550/1986.

Only one diphenol is used for polycarbonate homopolymers; a plurality of diphenols is used for polycarbonate copolymers.

Examples of suitable carbonic acid derivatives include phosgene or diphenyl carbonate.

Suitable chain terminators comprise both monophenols and monocarboxylic acids. Suitable monophenols comprise phenol itself, alkyl phenols such as cresols, p-tert.-butylphenol, p-n-octylphenol, p-iso-octylphenol, p-n-nonylphenol, cumylphenol and p-isononylphenol, halogenated phenols such as p-chlorophenol, 2,4-dichlorophenol, p-bromophenol and 2,4,6-tribromophenol.

Suitable monocarboxylic acids comprise benzoic acid, alkylbenzoic acids and halogenobenzoic acids.

Preferred chain terminators are phenols of formula (I)

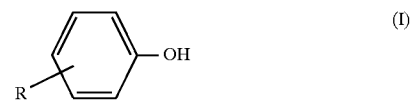

where
R is a branched or unbranched $C_8$ and/or $C_9$ alkyl radical.

The amount of chain terminator to be used is 0.1 mole % to 5 mole %, with respect to the moles of diphenols used in each case. The chain terminators may be added before, during or after phosgenation.

Suitable branching agents comprise the trifunctional compounds or the compounds with a functionality greater than three which are known in polycarbonate chemistry, particularly those containing three or more than three phenolic OH groups.

Examples of suitable branching agents include phloroglucine, 4,6-dimethyl-2,4,6-tri-(4hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane,2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)phenyl) orthoterephthalate, tetra-(4-hydroxyphenyl)-methane, tetra-(4-(4-hydroxyphenyl-isopropyl)-phenoxy)-methane and 1,4-bis-(4',4"-dihydroxytriphenyl)-methyl)-benzene, as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents which are optionally used is 0.05 mole % to 2 mole %, again with respect to the moles of diphenols used each time.

The branching agents may either be added to the diphenols and chain terminators in the aqueous alkaline phase, or may be added, dissolved in an organic solvent, before phosgenation. In the transesterification process the branching agents are used together with the diphenols.

All these measures for the preparation of polycarbonate starting materials are familiar to one skilled in the art.

Suitable UV absorbers are those compounds which, due to their absorption capacity below 400 nm are capable of effectively protecting polycarbonate from UV light.

UV absorbers which are particularly suitable are those of formula (II)

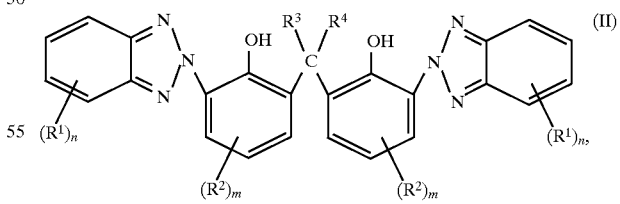

where
$R^1$ and $R^2$ are the same or different, and represent H, $C_1$–$C_{10}$ alkyl, $C_5$–$C_{10}$ cycloalkyl, $C_7$–$C_{13}$ aralkyl, $C_6$–$C_{14}$ aryl, OR5 or —(CO)—O—$R_5$, where $R_5$=H or $C_1$–$C_4$ alkyl, $R^3$ and $R^4$ are likewise the same or different, and represent H, $C_1$–$C_4$ alkyl, $C_5$–$C_6$ cycloalkyl, benzyl or $C_6$–$C_{14}$ aryl, m is 1, 2 or 3, and n is 1, 2, 3 or 4,
and those of formula (III)

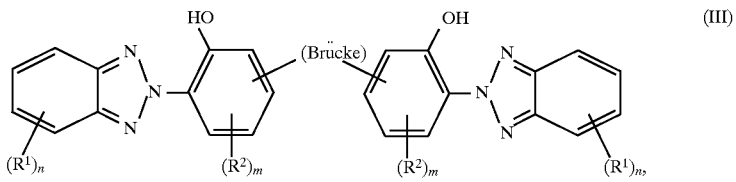

where

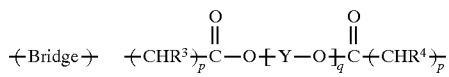

where p is an integer from 0 to 3,
q is an integer from 1 to 10, and
Y represents

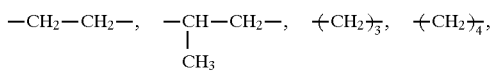

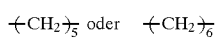

wherein in this case it is preferred that the OH group is in the para position with respect to the bridging group. In the above formula, $R^1$ and $R^2$, independently of each other, represent a hydrogen or a halogen atom, a $C_1$ to $C_{12}$ alkoxy, $C_7$ to $C18$ arylalkoxy or a $C_1$ to $C_{10}$-alkyl, -cycloalkyl, -aralkyl or -aryl radical, and $R^3$ and $R^4$ represent, independently of each other, a hydrogen atom or a $C_1$ to $C_{10}$ alkyl, cycloalkyl, aralkyl or -aryl radical, n is an integer from 0 to 4, and m is an integer from 1 to 3.

A preferred embodiment (IIIa) is represented by a bis-benzotriazole, in which ——(Bridge)—— represents

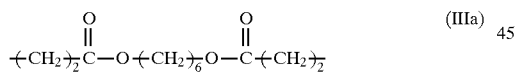

and is disposed in the para position with respect to the OH groups, and $R^2$ is a tertiary butyl in an ortho position with respect to the hydroxyl groups.

UV absorbers which are particularly suitable are those of formula (IV)

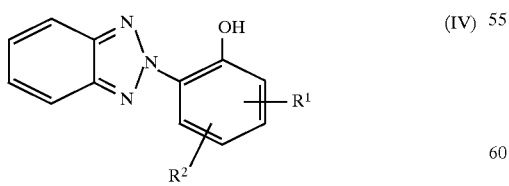

where $R^1$ and $R^2$ are the same or different $C_1$–$C_{15}$ alkyl radicals or aralkyl radicals, such as tert.-octyl or methyl, those of formula (V), those of formula (VI), those of formula (VIII), where
R=H, a $C_1$–$C_{18}$ alkyl, a $C_2$–$C_6$ alkyl substituted by a halogen or a $C_1$–$C_2$ alkoxy group, or benzyl, and R' represents hydrogen or methyl (see EP 500 496), and those of formula (VIII), where
X=a straight chain or branched alkylene containing 1 to 16 C atoms, o-, m- or p-xylyl; or an oxoalkanyl of formula —$CH_2$—$CH_2$(O—$CH_2$—$CH_2$)n—, —$CH_2$—CH($CH_3$)[O$CH_2$CH($CH_3$)]n or —$CH_2$—$CH_2$—$CH_2$—$CH_2$—(O$CH_2$$CH_2$$CH_2$$CH_2$), where n may =1 to 4, Y=hydrogen, or a straight chain or branched alkyl containing 1 to 18 C atoms, and Z=hydrogen, chlorine, a straight chain or branched alkyl containing 1 to 18 C atoms, or an alkoxy containing 1 to 18 C atoms (see U.S. Pat. No. 5,306,456).

The incorporation of the UV absorbers in the polycarbonates is effected in the known manner by mixing granulated polycarbonate material with the UV absorber(s) and subsequent extrusion, or by mixing solutions of the polycarbonate, in $CH_2C_{12}$ for example, with solutions of the UV absorbers in the same or different solvents, in acetone for example, and subsequent evaporation of the solvents in the known manner.

The polycarbonates prepared in this manner may contain additional additives for improving their sliding properties, such as esters of polyhydric alcohols with long chain fatty acids for example, such as pentaerythritol tetrastearate/palmitate, glycerine monostearate/palmitate or glycerine tristearate/palmitate, for example. In addition, the stabilisers which are known for polycarbonate can be used, such as phosphines, phosphites or Si-containing stabilisers. It is also possible to add flame retardants, pigments, colorants, finely divided minerals and other additives.

Multilayer polycarbonate sheets comprise both solid sheets and also twin- or triple-walled panels, and multi-wall sections and panels in particular, wherein either one or both sides of the plastic sheets may be provided with the layers containing UV absorbers.

The respective core layer of the polycarbonate sheets according to the invention may of course contain a basic amount of UV absorbers, namely 0.1% by weight to 0.5% by weight with respect to the weight of the core layer, for example.

Coextrusion as such is known from the literature (see EP 110 221 and EP 110 238, for example).

In the present case, the procedure is preferably as follows: an extruder for producing the core layer and an additional extruder for each outer layer are each attached to a coextrusion adapter. The adapter is constructed so that the melts forming the outer layers are deposited as an adherent thin layer on the melt of the core layer.

The multilayer length of melt produced in this manner is then formed into the desired shape (solid sheet or multi-wall panel) in the extrusion die connected downstream. The melt is then cooled under controlled conditions in the known manner by means of calendering (solid sheet) or vacuum-sizing (multi-wall panel) and is subsequently cut into lengths. An annealing oven may optionally be provided after sizing or calendering, for the elimination of stresses.

Subsequent processing operations are possible, such as negative thermoforming or surface treatment for example, such as the application of scratch-resistant lacquers, water-spreading layers and the like, for example.

Machines and apparatuses used in the Examples:

The machines and apparatuses used for the production of multilayer solid and multi-wall sheets and panels are described below.

1. A device for producing coextruded solid sheets 1.1 The device consisted of
  the main extruder having a screw of length 33D and a diameter of 75 mm with a degassing facility,
  the coextrusion adapter (feedblock system)
  a coextruder for applying the outer layer, having a screw of length 25D and a diameter of 30 mm,
  a sheet extrusion die of width 600 mm,
  a glazing calender with a horizontal roll arrangement, wherein the third roll could be swivelled by 45° in relation to the horizontal,
  a roller track,
  a pull-off device,
  a device for cutting into lengths (saw), and
  a delivery table.

1.2 Implementation:
  the polycarbonate granules of the base material were fed to the filling hopper of the main extruder, and the UV coextrusion material (outer layer material) was fed to that of the coextruder. Melting and conveying of the respective material were effected in the respective cylinder/screw plasticising system. The two molten materials were brought together in the coextrusion adapter and formed a composite after leaving the extrusion die and cooling on the glazing calender. The coextruded UV layer could be applied either to one side or to both sides of the base layer. The other devices were employed for the transport, cutting into lengths and deposition of the extruded sheets.

When sheet thicknesses greater than 1 mm were produced, the melt coming from the extrusion die entered the gap between rolls 1 and 2 and was subjected there to smoothing and cooling on both sides on the surfaces of the rolls. For this purpose it was necessary to employ a slight excess of melt which was situated in the so-called pug or bead in front of the roll gap.

When sheets of <1 mm were to be produced, the first roll was put out of operation, so that no smoothing occurred in the roll gap (chill roll process).

2. Device for producing coextruded multi-wall panels 2.1 The device consisted of
  the main extruder having a screw of length 33D and a diameter of 70 mm with a degassing facility,
  the coextrusion adapter (feedblock system)
  a coextruder for applying the outer layer, having a screw of length 25D and a diameter of 30 mm,
  a special sheet extrusion die of width 350 mm,
  a sizing device,
  a roller track,
  a pull-off device,
  a device for cutting into lengths (saw), and
  a delivery table.

2.2 Implementation:
  the polycarbonate granules of the base material were fed to the filling hopper of the main extruder, and the UV coextrusion material was fed to that of the coextruder. Melting and conveying of the respective material were effected in the respective cylinder/screw plasticising system. The two molten materials were brought together in the coextrusion adapter and formed a composite after leaving the extrusion die and cooling in the sizing device. The other devices were employed for the transport, cutting into lengths and deposition of the extruded sheets.

EXAMPLES

The materials used in the examples were characterised as follows:

| Example No. | Poly-carbonate | Branched/straight chain | Viscosity (Pa · s) $\gamma = 100\ s^{-1}$; 280° C. | Base/outer layer | US absorber type | Amount of UV absorber (%) |
|---|---|---|---|---|---|---|
| 1 and 6 | A | branched | 1100 | Base | V | 0.25 |
| 2 and 3 | B | branched | 1000 | Base | V | 0.25 |
| 4, 5, 12 and 13 | C | straight chain | 900 | Base | W | 0.3 |
| 7, 8, 9, | D | branched | 1700 | Base | W | 0.3 |

-continued

| Example No. | Poly-carbonate | Branched/straight chain | Viscosity (Pa·s) $\gamma = 100\ s^{-1}$; 280° C. | Base/outer layer | US absorber type | Amount of UV absorber (%) |
|---|---|---|---|---|---|---|
| 14 | | | | | | |
| 10 | E | straight chain | 1700 | Base | W | 0.3 |
| 11 | F | branched | 1400 | Base | W | 0.3 |
| 1, 2, 3, 4, 7, 8 | K | branched | 1200 | Outer | V | 7 |
| 6 | L | branched | 620 | Outer | V | 7 |
| 9 | M | straight chain | 700 | Outer | X | 10 |
| 10 and 11 | N | straight chain | 570 | Outer | X | 10 |
| 12 and 13 | O | straight chain | 850 | Outer | V | 7 |
| 14 | P | branched | 390 | Outer | V | 7 |

Polycarbonates A to P were prepared in the known manner from 2,2-bis-(4-hydroxyphenyl)-propane by the two-phase boundary process, phenol being used as the chain terminator and isatin bis-cresol optionally being used as the branching agent.

The relative viscosities of polycarbonates A to P were measured in the known manner, in $CH_2C_{12}$ at 25° C. and at a concentration of 0.5 g in 100 ml $CH_2C_{12}$, and were as follows:

| Product | Solution viscosity | Product | Solution viscosity |
|---|---|---|---|
| A | 1.285 | K | 1.315 |
| B | 1.285 | L | 1.265 |
| C | 1.293 | M | 1.300 |
| D | 1.315 | N | 1.295 |
| E | 1.318 | O | 1.292 |
| F | 1.298 | P | 1.243 |

The UV absorbers used had the following structures:

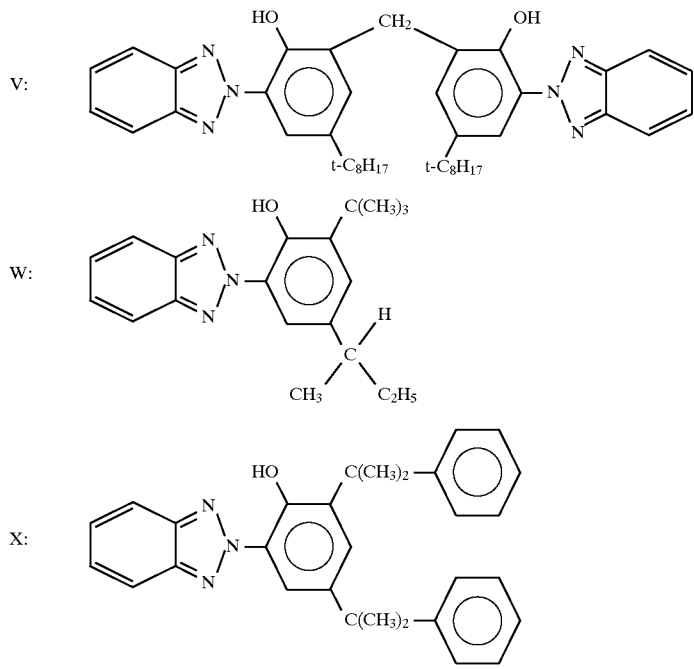

They were commercial products manufactured by Ciba AG.

COMPARISON EXAMPLES

Example 1

A coextruded 10 mm multi-wall sheet having UV-protection on one side was produced by means of an installation with a coextrusion adapter as described in Section 2. A slightly branched polycarbonate "A" was used as the base material of the sheet, the melt viscosity of which at 280° C. was $\eta_0=1100$ Pas, the viscosity measurement being based on a shear rate of $\gamma=100\ sec^{-1}$.

The melt was coextruded with the UV-protected PC material "K". The latter contained 7% by weight of UV stabiliser "V". The melt viscosity of the UV-protected material was $\eta=1200$ Pas at 280° C. and $\gamma=100\ sec^4$. The viscosity difference was $\Delta\eta=+100$ Pas.

The sheet had flow defects in the region of the UV layer. These could be seen particularly clearly in the region between the bridges.

EXAMPLE 2(5 mm sheet and Example 3

(1 mm sheet)

5 mm and 1 mm (using the chill roll process) solid sheets were produced by means of a Breyer sheet installation as described in Section 1. Polycarbonate "B" was used as the base material, the melt viscosity of which at 280° C. and $\gamma=100\ sec_{-1}$ was $\eta=1000$ Pas. Polycarbonate "K" was used as the UV coextrusion material, as in Example 1. The viscosity difference was $\Delta\eta=+200$ Pas.

The 5 mm and 1 mm sheets had flow defects in the region of the UV layer. Example 4 (5 mm sheet) and Example 5 (1 mm sheet)

5 mm and 1 mm (using the chill roll process) solid sheets were produced by means of a Breyer sheet installation as described in Section 1. Polycarbonate "C" was used as the base material, the melt viscosity of which at 280° C. and γ=100 sec$^{-1}$ was η$_0$ =900 Pas. Polycarbonate "K" was used as the UV coextrusion material, as used in Example 1. The viscosity difference was Δη=+300 Pas.

The 5 mm and 1 mm sheets had flow defects in the region of the UV layer.

Examples of Application

Example 6

10 mm multi-wall panels were produced using an installation as described in Section 2, polycarbonate "A" being used as the base material, as in Example 1. Polycarbonate "L" was used as the UV coextrusion material. This contained 7% by weight of UV stabiliser "V". The melt viscosity at 280° C. and γ=100 sec$^{-1}$ was η=620 Pas (Δμ=−480 Pas).

Faultless sheets without flow defects could be produced.

Example 7 (5 mm sheet) and Example 8 (1 mm sheet)

The production conditions for the solid sheet installation were selected as in Examples 2 and 3. The base material was a slightly branched polycarbonate "D", the melt viscosity of which at 280° C. and γ=100 s-1 was η0=1700 Pas. UV material "K" was used for coextrusion. The difference in melt viscosities was Δη=−500 Pas.

Faultless sheets without flow defects could be produced.

Example 9

The production conditions for multi-wall panel production from polycarbonate "D", were selected as described in Example 7. Polycarbonate "M" was coextruded as the UV material. This material contained 10% by weight of stabiliser "X". The viscosity of the melt at 280° C. and at γ=100 sec−1 was η=700 Pas (Δη=−1000 Pas).

Faultless sheets without flow defects could be produced.

Example 10

The production conditions for the multi-wall panel installation were selected as described in Example 6. A straight chain polycarbonate "E" was used as the base material. Its melt viscosity was η=1700 Pas at 280° C. and γ=100 sec−1. The material was coextruded with polycarbonate "N", which contained 10% of UV stabiliser "X". The viscosity of the UV melt was η=570 Pas at 280° C. and γ=100 sec$^{-1}$ (Δη=−1130 Pas).

Faultless sheets without flow defects could be produced.

Example 11

10 mm multi-wall panels were produced using an installation as described in Section 2, wherein polycarbonate "F", which had a melt viscosity of η=1400 Pas at 280° C. and γ=100 sec$^{-1}$, was used as the base material. The UV coextrusion material was polycarbonate "N". The material is described in Example 9.

The difference in viscosity was Δη=−830 Pas. The panels produced in this manner were streak-free and without flow defects.

Example 12 (5 mm sheet) and Example 13 (1 mm sheet)

The production conditions for the solid sheet installation were selected as in Examples 2 and 3. Polycarbonate "C" was used as the base material, as in Examples 4 and 5. UV material "O", which contained 7% by weight of UV stabiliser "V", was used for coextrusion. The melt viscosity η of the UV-protected melt was 850 Pas at 280° C. and γ=100 s−1 (Δη=−50 Pas).

The sheet exhibited no flow defects.

Example 14

10 mm multi-wall panels were produced using an installation as described in Section 2, wherein polycarbonate "D" as described in Example 7 was used as the material. UV material "P", which contained 7% by weight of UV stabiliser V, was used for coextrusion. The melt viscosity η of the UV-protected melt 380 Pas at 280° C. and at γ=100 s−1 (Δη=−1320 Pas).

The panels exhibited no flow defects.

We claim:

1. UV-protected, multilayer polycarbonate sheets containing:
   1.1 a base sheet of thermoplastic polycarbonate having two sides which contains 0 to 1 t by weight of UV absorber and which has a viscosity of 500 Pa·s to 2500 Pa·s at 280° C. and at a shear rate of 100 s$^{-1}$;
   1.2 a second layer of thermoplastic polycarbonate on one or on both sides of the base sheet, which has a content of UV absorber of 2% by weight to 20% by weight and which has a viscosity of 200 Pa·s to 2300 Pa·s at 280° C. and at a shear rate of 100 s$^{-1}$, characterized in that the viscosity of the second layer 1.2 is at least 50 Pa·s lower than the viscosity of the base sheet 1.1.

2. Polycarbonate sheets according to claim 1, characterized in that the viscosity of the second layer 1.2 is 100 Pa·s to 2000 Pa·s lower than the viscosity of the base sheet.

3. Polycarbonates according to claim 1, comprising
   3.1 the base sheet 1.1;
   3.2 the second layer 1.2 on one or both sides of the base sheet; and
   3.3 on the side of the second layer 1.2 facing away from the base sheet 1.1, a protective layer of polycarbonate, characterized in that the protective layer has a UV absorber content of 0.1% by weight to 20% by weight, a viscosity of 200 Pa·s to 2300 Pa·s at 280° C. and at a shear rate of 100 s$^{-1}$, and a thickness of 2 μm to 100 μm.

4. Polycarbonates according to claim 3, characterized in that the viscosity of the second layer 1.2 is 100 Pa·s to 2000 Pa·s lower than the viscosity of the base sheet.

* * * * *